United States Patent
Avegliano et al.

(10) Patent No.: US 9,578,512 B1
(45) Date of Patent: Feb. 21, 2017

(54) MOBILE DEVICE TO DEVICE COMMUNICATIONS FOR PRIVACY-PRESERVED RETRIEVAL OF CONTEXTUALIZED MOBILE DEVICE DATA

(71) Applicant: International Business Machines Corporation, Armonk, NY (US)

(72) Inventors: Priscilla B. Avegliano, Sao Paulo (BR); Carlos H. Cardonha, Sao Paulo (BR); Diego S. Gallo, Sao Paulo (BR); Julio Nogima, Londrina (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/864,231

(22) Filed: Sep. 24, 2015

(51) Int. Cl.
  H04M 3/16 (2006.01)
  H04W 12/08 (2009.01)
  H04W 8/00 (2009.01)
  H04W 4/02 (2009.01)

(52) U.S. Cl.
  CPC ............ *H04W 12/08* (2013.01); *H04W 4/02* (2013.01); *H04W 8/005* (2013.01)

(58) Field of Classification Search
  USPC ........................................ 455/411
  See application file for complete search history.

(56) References Cited

U.S. PATENT DOCUMENTS

| | | | |
|---|---|---|---|
| 6,950,821 B2 | 9/2005 | Faybishenko et al. | |
| 7,224,987 B1 | 5/2007 | Bhela et al. | |
| 8,255,469 B2 | 8/2012 | Leppanen et al. | |
| 8,874,653 B2 | 10/2014 | Chang | |
| 2010/0302947 A1 | 12/2010 | Leppanen et al. | |
| 2014/0293928 A1 | 10/2014 | Boldyrev et al. | |
| 2014/0331329 A1 | 11/2014 | Edge et al. | |

FOREIGN PATENT DOCUMENTS

WO   2014172090   10/2014

OTHER PUBLICATIONS

Malik et al., "Enhanced Sharing and Privacy in Collaborative Virtual Teams", Journal of Information Assurance and Security, Mar./Apr. 2012, pp. 60-69, vol. 7.

(Continued)

*Primary Examiner* — Joel Ajayi
(74) *Attorney, Agent, or Firm* — Scully, Scott, Murphy & Presser, P.C.; Louis J. Percello, Esq.

(57) ABSTRACT

Privacy-preserved retrieval of contextualized mobile device data. A context of a query may be determined. A dissemination point device may be determined based on the context to which to disseminate the query. The query may be transmitted to the dissemination point device, which causes the dissemination point device to trigger a point-to-point communication among mobile devices in search of data that is responsive to the query. That data may be received from one or more of the mobile devices that are determined to be within a geographical range, that store the data that is responsive to the query in the one or more of the mobile devices, and have chosen to provide the data. The data may be received without identifications of the one or more of the mobile devices.

20 Claims, 4 Drawing Sheets

(56) References Cited

OTHER PUBLICATIONS

Caceres, R., et al., "Virtual individual servers as privacy-preserving proxies for mobile devices", Proceeding MobiHeld '09 Proceedings of the 1st ACM workshop on Networking, systems, and applications for mobile handhelds Aug. 17, 2009, pp. 37-42 ACM, Barcelona, Spain.

Gilbert, P., et al. "Toward trustworthy mobile sensing", Proceedings of the Eleventh Workshop on Mobile Computing Systems & Applications, HotMobile, ACM, Feb. 2010, 6 pages, Annapolis, MD.

Jedrzejczyk, L., et al. "On the impact of real-time feedback on users' behaviour in mobile location-sharing applications", Proceedings of the Sixth Symposium on Usable Privacy and Security, ACM, Jul. 14-16, 2010, 12 pages.

Ku, W.-S., et al. "Query integrity assurance of location-based services accessing outsourced spatial databases", Advances in Spatial and Temporal Databases. Springer Berlin Heidelberg, Jul. 2009, pp. 18 pages.

Ahamed, S. I., et al.,"A trust-based secure service discovery (TSSD) model for pervasive computing", Computer Communications, Dec. 2008, pp. 4281-4293, vol. 31, No. 18.

MOBILE DEVICE TO DEVICE COMMUNICATIONS FOR PRIVACY-PRESERVED RETRIEVAL OF CONTEXTUALIZED MOBILE DEVICE DATA

FIELD

The present application relates generally to computers and computer applications, and more particularly to mobile device to device communications, disseminating query to mobile devices and retrieving contextualized mobile device data while preserving data privacy.

BACKGROUND

Mobile devices can serve as sensor devices that collect various types of data from wherever and whenever their owners carry them. Applications on these devices may be used to automatically capture data such as environment audio and video indexed by location and time. Discovering and retrieving such data kept in the mobile devices currently require a central server to access and transfer the data to a common remote location. However, if made accessible to a central server or transferred to a remote location the privacy of the user that collected the data may be compromised.

BRIEF SUMMARY

A computer-implemented method and a system for privacy-preserved retrieval of contextualized mobile device data may be provided. In one aspect, the method may include receiving a query. The method may also include determining a context of the query. The method may further include determining a dissemination point device based on the context to which to disseminate the query. The method may also include transmitting the query to the dissemination point device and causing the dissemination point device to trigger a point-to-point communication among mobile devices in search of data that is responsive to the query. The method may further include receiving from one or more of the mobile devices that are determined to be within a geographical range, that store the data that is responsive to the query in said one or more of the mobile devices, and have chosen to provide the data, the data received without identifying the one or more of the mobile devices. The method may also include presenting the data to a requester.

A system for privacy-preserved retrieval of contextualized mobile device data, in one aspect, may include one or more processors coupled to at least one communication device. The one or more processors may be operable to receive a query. The one or more processors may be further operable to determine a context of the query. The one or more processors may be further operable to determine a dissemination point device based on the context to which to disseminate the query. The one or more processors may be further operable to transmit the query to the dissemination point device and cause the dissemination point device to trigger a point-to-point communication among mobile devices in search of data that is responsive to the query. The one or more processors may be further operable to receive from one or more of the mobile devices that are determined to be within a geographical range, that store the data that is responsive to the query in the one or more of the mobile devices, and have chosen to provide the data, the data received without identifying the one or more of the mobile devices. The one or more processors may be further operable to present the data to a requester.

Yet in another aspect, a method for privacy-preserved retrieval of contextualized mobile device data may include receiving a query at a mobile device, the query comprising at least a context. The method may also include determining at the mobile device whether the mobile device is within the context. The method may further include responsive to determining that the mobile device is within the context, determining whether the mobile devices stores the data that is responsive to the query. The method may also include responsive to determining that the mobile device stores the data, notifying a user of the mobile device and requesting authorization to retrieve and transmit the data. The method may further include responsive to receiving the authorization, retrieving the data from a memory of the mobile device and transmitting the data via a communication network to a remote requester. The method may also include responsive to not receiving the authorization, transmitting the query to one or more other mobile devices. The method may further include responsive to determining that the mobile device is not within the context, transmitting the query to the one or more other mobile devices. The method may also include responsive to determining that the mobile device does not store the data, transmitting the query to the one or more other mobile devices.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Mobile device data may be discovered and retrieved in a way that maintains the privacy of the device user. For example, the searched data can be discovered without compromising the identity of the prospective source user, for instance, at the source user's discretion or decision to provide or not to provide the required or requested data.

In one embodiment, method, system and/or techniques are provided that disseminate a query among mobile devices in a peer-to-peer fashion by maintaining the anonymity of the users. The query contains the details of the data being searched (e.g., a video stream captured in a certain geolocation within a specific time period). Responsive to determining that the query matches the data in the device, the method and/or system of the present disclosure in one embodiment notifies the device owner or user, for instance, by presenting a notification on the device. The device owner or user may be provided with an option to authorize the retrieval of the particular data from the device. Hence, in one aspect, data on a mobile device is provided to the requester at the mobile device owner or user's discretion. In this way, the collected data residing in the mobile device is under the control of the owner or user, and only the portions that are of significant importance to others can be made available.

Figure 1:
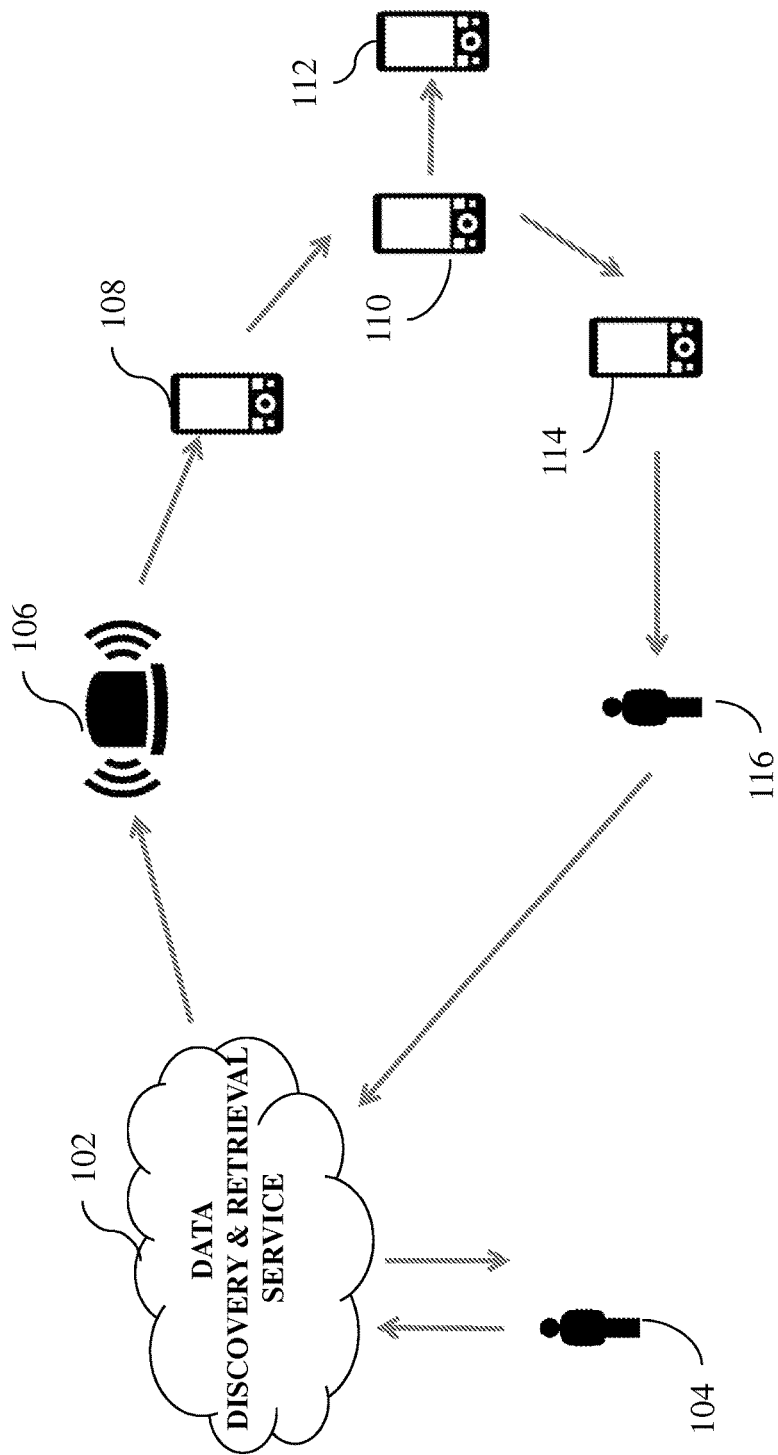
FIG. 1 is a diagram illustrating an overview of a system and method of the present disclosure in one embodiment.

FIG. 1 is a diagram illustrating an overview of a system and method of the present disclosure in one embodiment. A computer system may implement a data discovery and retrieval service 102. The computer system that implements the data discovery and retrieval service 102, for example, may include one or more processors such as a central processing unit or another processing device that performs the functions of the data discovery and retrieval service in one embodiment of the present disclosure. An example of such a computer system is shown and described with reference to FIG. 4 below.

The data discovery and retrieval service 102 may include a user interface or a graphical user interface that allows a user 104 to enter a query and/or search for data. Such a user interface may receive user query and present the results of the query or search to the user. If no data is found that satisfy the user query or search, the user interface may present appropriate information to the user, for example, that no result has been retrieved.

The data discovery and retrieval service 102, in one embodiment, determines the context of required information and issues a query for dissemination to a mobile device determined to be the best starting point candidate 106. For example, the data discovery and retrieval service 102 may include a query process that determines a context of a query and determines a query dissemination point based on the context. The context may include one or more of geographic information about the remote device, personal profile in the remote device, type and/or capabilities of the remote device, battery level of the remote device. The query in one embodiment is given an expiration criterion (e.g., time) such that the query request expires if the query is outside of the expiration criterion.

The data discovery and retrieval service 102 may also include a receiving process that receives responses from one or more remote devices (e.g., a mobile device 114), that elected to respond to the query, e.g., without the identity of the remote devices. The response may be provided in a form of one or more of a file, an image, a text, or other document. The data content of the response may include one or more of audio data, video data, measurement data from sensor devices such as but not limited to, accelerometer, magnetometer, gyroscope, barometer, thermometer or another temperature gage.

In one embodiment, the data discovery and retrieval service 102 transmits the query to a determined dissemination point 106. In one embodiment, dissemination points (e.g. 106) are devices registered with the discovery and retrieval service 102. For instance, the service 102 knows the dissemination points (e.g., 106) a priori. The service 102 knows about a number of possible dissemination points and may classify them by aspects such as geographical location, profile of users that pass or visit the area. For example, each dissemination point (e.g., 106) has characteristics such as location and type of users that pass or visit the location, and others characteristics. The context is used to determine the best dissemination point (or points) to transmit a query. An example of such context may include, but are not limited to, location. Another example is the subject. For example, a query can be about an event for example, and a corresponding dissemination point (or points) may be the ones closer to where the fans of the event get together.

The data discovery and retrieval service 102 may determine one or more dissemination points for the query based on the query context. For example, if the context specifies a location, the selected dissemination point is determined as the one closest to that location. It should be noted that there may be more than one dissemination point based on the context. If a context is something different than location, for example, context specifies a subject, then the service 102 can determine dissemination points closer to users that are more likely to have the searched data. For instance, the dissemination points are physical locations where mobile device users passing or visiting the surroundings are more likely to have the searched data in their devices. Depending on the context certain dissemination points are more suitable than others. The most appropriate one or ones is selected by the service 102 in one embodiment In one embodiment, the dissemination point 106 may be a processing device such as a computer or a mobile device or another computing device. For example, the dissemination point 106 may be implemented by a computing device connected to the discovery and retrieval service 102, and with wireless connection to transmit the queries to the nearby devices. In one embodiment, the service 102 may also serve as a dissemination point if it fits the context of the query, e.g., with many other dissemination points.

In one embodiment, the dissemination point 106 transmits the query to all mobile devices in range (e.g., 108, 110, 112, 114). In one embodiment, the dissemination point 106 sends a geographical range parameter to the mobile device(s) to qualify where the query is valid. The mobile device forwards the query until it gets out of the geographical range or the query time expires. In one embodiment, the dissemination point 106 disseminates the query among mobile devices by physical proximity, e.g., to those mobile devices (e.g., 108, 110, 112, 114) that are proximate to the dissemination point 106 by contextual distance, e.g., by geographic distance.

In one aspect, disseminating a query to a mobile (e.g., 108) device triggers the mobile device to communicate the query (forward the query) to one or more second mobile devices (e.g., 110), and so forth, in a peer-to-peer communication manner. An application running on a mobile device may perform a search or query in the mobile device's memory for the requested response. A mobile device (e.g., 114) that is identified to have the response data for the query may notify the user 116 of the mobile device 114 that the requested data is found in the mobile device 114. The mobile device 114 provides the user 116 with an option to retrieve the response data from the memory of the mobile device 114 and send the data to the data discovery and retrieval service 102. Thus, a mobile device 114 has an option to respond to the query to not to respond to the query. The choice of whether or not to respond may be kept confidential.

In one embodiment, the query has an expiration time which stops the dissemination. The dissemination of the query to a device also may terminate responsive to detecting that the device is no longer within the query context, e.g., the device has moved away from a geographic area.

Figure 2:
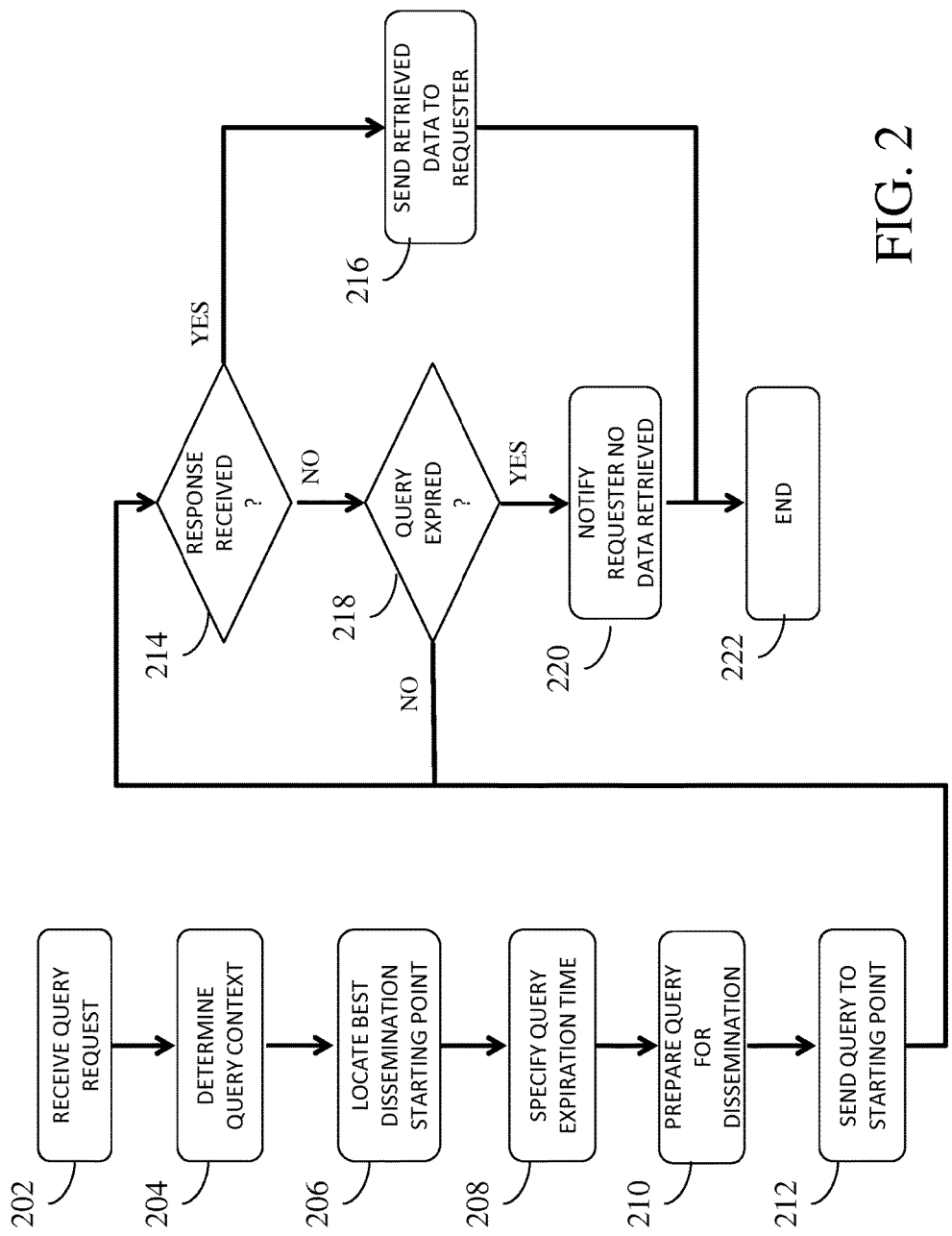
FIG. 2 is a flow diagram illustrating a process performed by a data discovery and retrieval service in one embodiment of the present disclosure.

FIG. 2 is a flow diagram illustrating a process performed by a data discovery and retrieval service (e.g., 102 in FIG. 1) in one embodiment of the present disclosure. At 202, a query request is received, for example, from an interface program, e.g., from a user interface that received the query from a user. In another aspect, a query may be received from another automated system that is performing a search for data, for example, via a program interface.

At 204, the context of the query is determined. For instance, the query may be parsed using a natural language processing (NPL) technique or another parsing technique to extract the context of the query. An example context may be related to geographic location, for example, a query may be asking about a particular geographic location. Another example of context can be a particular subject or topic.

At 206, a dissemination point device is determined or located based on the context, as a starting device for communication the query. For instance, the discovery and retrieval service has a priori list of dissemination points with information such as location and profile of users that visit the surroundings, among others. In case the context is a geographical location, for example, the discovery and retrieval service selects the dissemination point closer to that location. In case the context is a subject, e.g., events and more specifically games of a particular team, the dissemination point (or points) may be selected as the ones where fans of that team is more likely to get together.

At 208, an expiration time for the query may be specified. The expiration time may be received from user entered query. In another aspect, the expiration time may be automatically configured, for example, based on the context or another criterion.

At 210, the query is prepared for dissemination. The query includes the criteria of the data request. The query may also include one or more of the expiration time of the query and a reason for the request. For instance, the search statement (e.g., video captured on a specific location at a specific time) may be specified; the reason of the requester to search for the data defined by the query may be specified; the context associated with the query (e.g., location or subject) may be specified; and the expiration time may be specified.

At 212, the query that is prepared is sent to the dissemination point device, for example, via a communication network such as a wireless network. In one aspect, sending or transmitting the query to the dissemination point device triggers a remote device to device (or mobile device to device) peer-to-peer communications in searching for a response to the query.

At 214, it is determined whether a response is received responsive to sending the query. The response includes, for example, data retrieved from one or more remote or mobile devices that respond to the query.

At 216, the response data is sent to the requester. For instance, the response data may be transmitted to a user who entered the query by displaying or presenting the response data on that user's device display or user interface. In one embodiment, the retrieved data from one or more mobile devices may be consolidated or organized in a user presentable format before presenting the data to the user. The processing for this query then may end at 222.

If no response is received at 214, it is determined whether the query has expired at 218, e.g., the expiration time for the query has passed. If the query is not expired, the processing logic waits for the response at 214. If the query has expired, at 220, the requester is notified that no response data has been retrieved or identified. The processing for this query then may end at 222.

Figure 3:
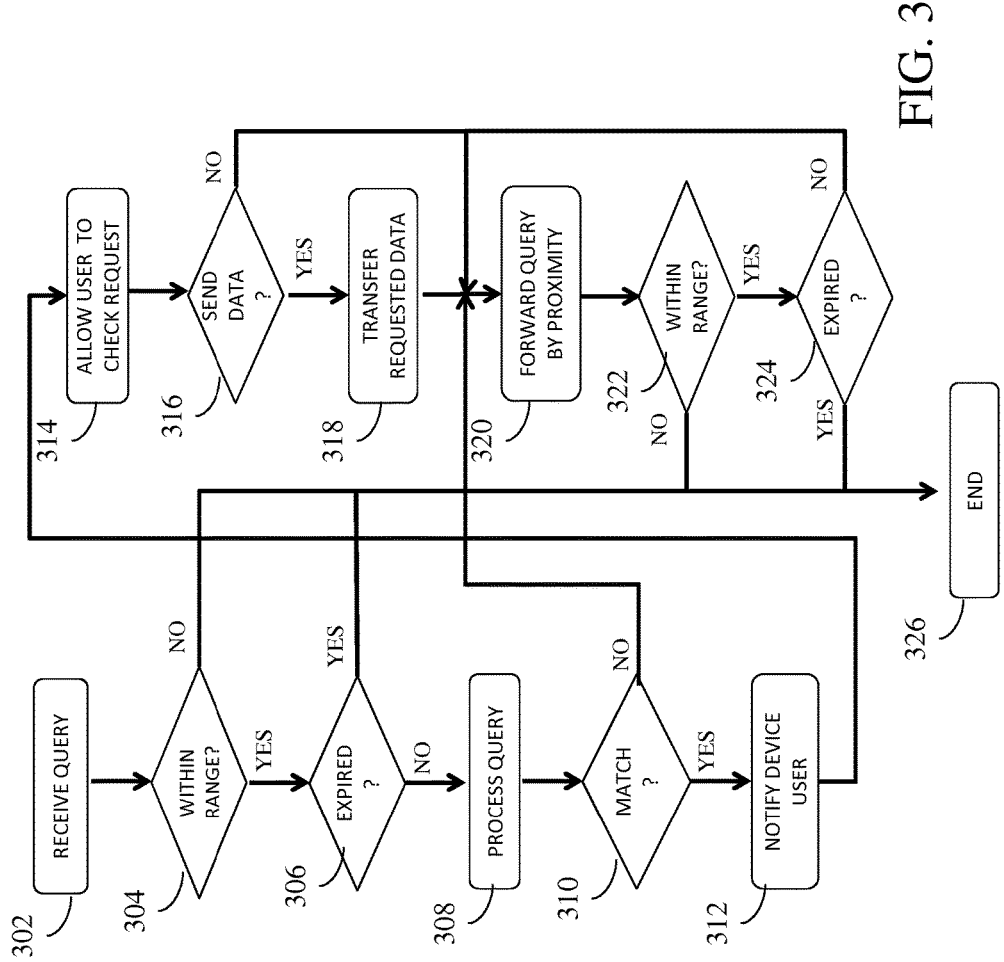
FIG. 3 is a flow diagram illustrating a processing performed by a remote or mobile device receiving a query in one embodiment of the present disclosure.

FIG. 3 is a flow diagram illustrating a processing performed by a remote or mobile device receiving a query, e.g., disseminated from a dissemination point or a data discovery and retrieval service, in one embodiment of the present disclosure. For instance, a process (e.g., an application process) running on a remote or mobile device may perform the processing logic shown in FIG. 3. A remote or mobile device starts in listening mode, for example, for a query. At 302, a query is received. For example, an application running on a remote device or a mobile device receives the query from the data discovery and retrieval service, for example, via the dissemination point. At 304, the remote or mobile device determines whether the mobile device is within the context of the query. An example context is a location. For example, the remote or mobile device retrieves the specified location and the distance range, e.g., specified by the dissemination point when transmitting the query to the device. The remote or mobile device retrieves or determines the location of the device itself, e.g., using its sensors. Based on its location and the specified location and the distance range, the remote or mobile device determines whether or not the device is within the specified location range. If the remote or mobile device is outside the geographic range of the query (e.g., outside of the location range specified by the dissemination point), the processing logic ends at 326.

If at 304, it is determined that the mobile device is within the query range, at 306, the remote or mobile device determines whether the query has expired. For instance, the processing logic may include comparing the current time with the expiration time of the query to determine whether the query has expired. If it is determined that the query has expired, the processing logic may end at 326.

At 308, the query is processed. For example, the mobile device is within the query range (e.g., location range) and the query is still pending, that is, not expired. The mobile device thus processes the query. At 310, it is determined whether the data stored on the mobile device matches the data requested by the query. If at 310, it is determined that the mobile device does not have the data that matches the data requested by the query, the processing logic proceeds to 320.

At 310, if it is determined that the mobile device has the data that matches the data requested by the query, the mobile device notifies the device user, e.g., by presenting on a user interface, the information that matches the data requested by the query. The mobile device may also ask the user for authorization to send the data from the mobile device. Thus, at 314, the user is allowed to check the request. At 316, it is determined whether the user authorized to send the data. If the user authorizes the sending of the data stored in the mobile device, at 318, the data is transferred, for example, transmitted via a communication network to the requesting computer or computer process and the logic proceeds to 320. At 316, if it is determined that the user does not authorize sending of the data, the processing logic proceeds to 320.

At 320, the mobile device forwards or retransmits the query to one or more other mobile devices in proximity. For instance, the mobile device enters a broadcast mode and transmits the query to other mobile devices in order for those mobile devices to determine whether those mobile devices can respond to the query. The mobile devices that receive the forwarded query would also perform the processing logic described with reference to FIG. 3.

At 322, the mobile device determines whether the mobile device is still within the query context. For instance, if the mobile device has moved away from a location while the processing logic is being performed, the test at 322 may result in the negative (out of the query location range) even if at 304, it was determined that the mobile device was in context at the time. If the mobile device is not within the query context at 322, the processing may end at 326. Otherwise, if the mobile device is still within the query context at 322, it is determined whether the query has expired at 324. If the query has expired, the processing logic may end at 326. Otherwise, if the query is still pending (not expired), the processing logic may continue to 320, where the query may be forwarded to other mobile devices. This mode of forwarding at 320, 322 and 324 may repeat until the mobile device is out of the query context as determined at 322 or the query expires as determined at 324.

A system and/or method of the present disclosure in one embodiment search data captured by mobile devices while preserving the privacy of the data owner. In one embodiment, mobile devices may capture and index data locally. An application or process running on the mobile device may receive query requests, process them against its local data and forward the query to other devices in the proximity, e.g., within a communication reach. A service, e.g., which may be cloud-based, allows users to search for data on mobile devices within a context. The query is disseminated by proximity and maintaining privacy. The system and/or method of the present disclosure in one embodiment allow for discovering and forwarding queries to the nodes (remote or mobile devices) with most likelihood of containing the requested data.

For instance, a method of searching data captured by mobile devices while preserving the privacy of the data owner may include receiving by a cloud-based service a user's request to search for data in mobile devices within a context. A first mobile device may receive the query request, and the mobile device (e.g., a mobile application on the mobile device) may process the query against its local data. If the query matches the local data, the mobile device may notify the device user. If the device user agrees to upload the captured data to the cloud-based service, the data is transmitted. The first mobile device may also forward the query request to a second mobile device for processing the query request.

The following describes examples of user case or application scenarios in one embodiment. This example illustrates querying data with specific location and specific time context. Users may capture geo-located environment data such as audio and video using mobile devices or sensor devices, for example, routine data that a user would capture as the user visits a neighborhood, walk and/or drive to work or school. This data can be indexed and stored in the mobile device or a companion mobile device in the case of sensors. Subsequently, another user may be interested in an event that happened in a particular location and time (e.g., event investigation). A data discovery and retrieval service, e.g., a cloud-based system, receives the query request from an authenticated user. The service then forwards the query to a dissemination point in the region of interest targeting the devices that are more likely to contain the information. The query is spread from device to device by proximity with no user identification (ID). If a device contains the requested data the device (e.g., a query application running on the device) informs the user that the device possesses the data being searched for. In addition, the device may provide the user with the reason the data is being requested. If the device owner decides to do so, the data owner allows the upload of the requested data to the data discovery and retrieval service, e.g., cloud, making the data available to the requester.

This next example also illustrates a query with a specific place at certain times context. For example, query may be a request for how a particular location looks like at a particular time. Data may be searched for on mobile devices to determine how that location looks like every periodic interval, e.g., Saturday around noon. The data discovery and location service may build this requested picture from data collected from multiple devices.

Another example scenario illustrates a query with a mobility context. For example, a search may be performed to look for users who took a particular route in the city (e.g., visiting points of interest).

In one embodiment, the system and/or method allows for reducing the number of devices searched by defining the search context (e.g., geographical location). This way, savings in processing resources and reduction in communication network congestion may be achieved. In one embodiment, the scope of search is restricted to the devices with most likelihood to match the query. Query dissemination is done by proximity avoiding the need to: inform location to a central server (privacy preservation), filter the request locally which generates considerable overhead to the device, broadcast the query over the network infrastructure (improving the scalability issue). In one embodiment, the requested data may be provided only if the data owner decides to do so. This decision may be based on information (e.g., reason) provided in conjunction with the query.

In one aspect, the data that is kept in a mobile or remote device may be only transmitted by request and with explicit authorization, which may eliminate a need to obfuscate the data for preserving privacy. In another aspect, a peer-to-peer architecture instead of centralized approach to share the remote or mobile data may be employed. In receiving data from mobile devices, all identifications of the mobile devices may be kept anonymous. In yet another aspect, users are allowed to define exactly the type of information to be shared. Contextualized information such as files containing geo-referenced information of a target region may be shared according to an embodiment of a system and/or method of the present disclosure.

Figure 4:
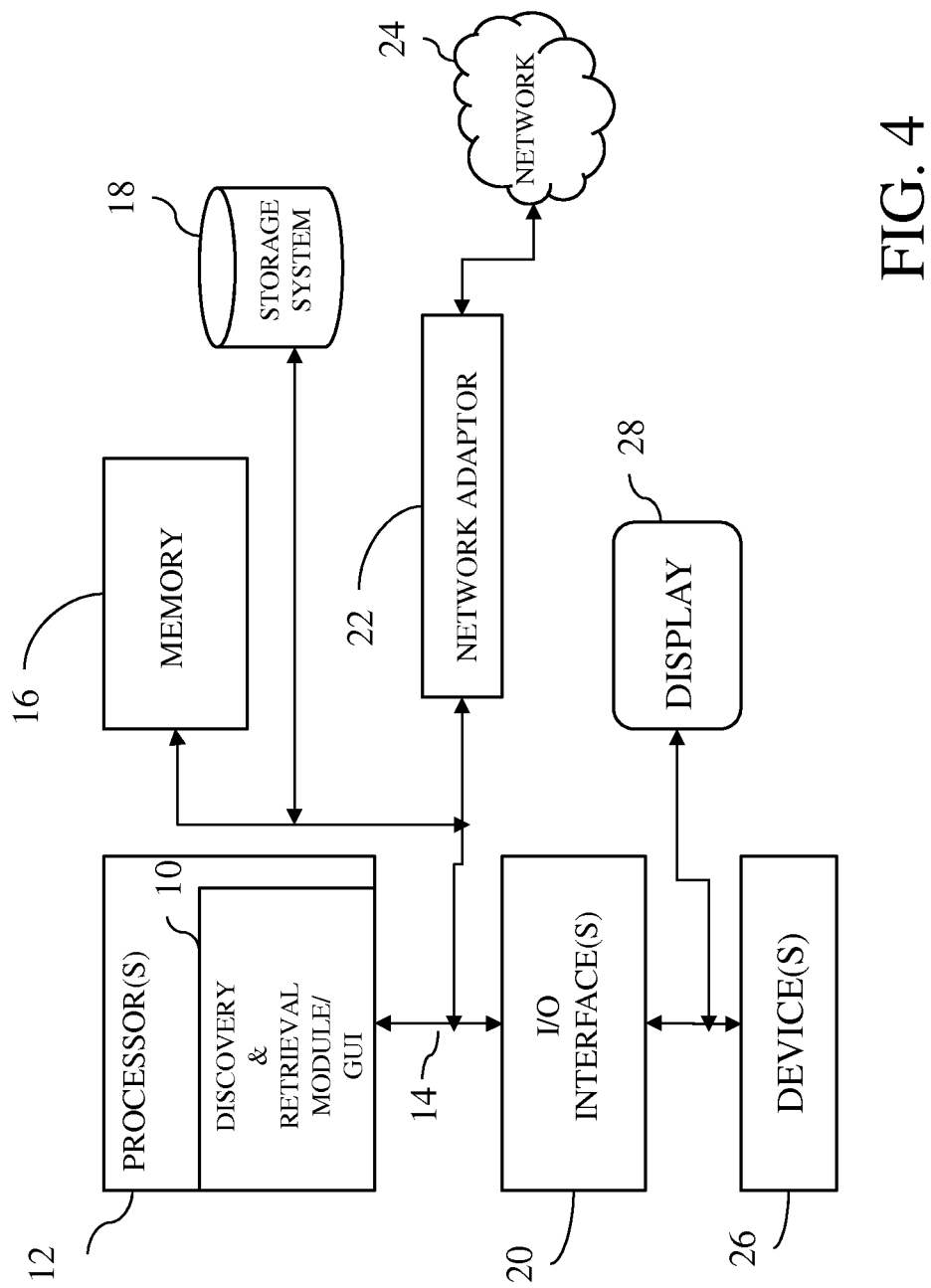
FIG. 4 illustrates a schematic of an example computer or processing system that may implement a system for querying mobile devices by triggering peer-to-peer communication among the mobile devices in one embodiment of the present disclosure.

FIG. 4 illustrates a schematic of an example computer or processing system that may implement a system for querying mobile devices by triggering peer-to-peer communication among the mobile devices in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a data discovery and retrieval module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method for privacy-preserved retrieval of contextualized mobile device data, comprising executing on a processor the steps of:
   receiving a query transmitted by a requester;
   determining a context of the query based on parsing the query to determine at least location information and subject associated with the query;
   determining a dissemination point device based on the context to which to disseminate the query, the dissemination point device selected from a plurality of registered dissemination point devices, the plurality of registered dissemination point devices comprising characteristic attributes comprising at least geographical location and types of users that pass the geographical location, and the dissemination point device is selected based on comparing the corresponding characteristic attributes with the context of the query;
   transmitting the query to the dissemination point device and causing the dissemination point device to trigger a point-to-point communication among mobile devices in search of data that is responsive to the query;
   receiving from one or more of the mobile devices that are determined to be within a geographical range, that store the data that is responsive to the query in said one or more of the mobile devices, and in which respective one or more of users of the one or more mobile devices have authorized retrieving and providing of the data, the data received without identifying the one or more of the mobile devices; and
   presenting the data to a requester.

2. The method of claim 1, further comprising:
   determining an expiration criterion associated with the query, wherein the query is transmitted to the dissemination point device with the expiration criterion.

3. The method of claim 2, wherein the expiration criterion comprises an expiration time for the query.

4. The method of claim 2, wherein the point-to-point communication is caused to occur until the expiration criterion is met.

5. The method of claim 1, further comprising:
   determining a reason for the query, wherein the query is transmitted to the dissemination point device with the reason.

6. The method of claim 1, wherein the causing the dissemination point device to trigger a point-to-point communication among mobile devices in search of data that is responsive to the query, comprises:
   causing triggering of a first mobile device to determine whether the first mobile device is within the geographical range, and if the query is not expired, the first mobile device transmits the query to a second mobile device.

7. The method of claim 6, wherein the causing the dissemination point device to trigger a point-to-point communication among mobile devices in search of data that is responsive to the query, further comprises:

causing the first mobile device to search a memory of the first mobile device for the data that is responsive to the query, wherein the first mobile device, responsive to finding the data in the memory of the first mobile device, provides an option to a user of the first mobile device to authorize retrieving the data and sending to the requester.

8. The method of claim 7, wherein the causing the dissemination point device to trigger a point-to-point communication among mobile devices in search of data that is responsive to the query, further comprises:

causing the first mobile device to transmit the data responsive to receiving an authorization from the user of the first mobile device, and causing the first mobile device to forward the query to the second mobile device responsive to determining that the user of the first mobile device does not authorize the retrieving and sending of the data.

9. The method of claim 1, wherein the context comprises one or more of geographic location and subject.

10. The method of claim 1, wherein the data that is responsive to the query comprises one or more of an audio, video, an image, a file, a text response, a measurement data from one or more sensors comprising magnetometer, gyroscope, barometer, thermometer.

11. A system for privacy-preserved retrieval of contextualized mobile device data, comprising:

one or more processors coupled to at least one communication device, the one or more processors operable to receive a query transmitted by a requester, the one or more processors further operable to determine a context of the query based on parsing the query to determine at least location information and subject associated with the query, the one or more processors further operable to determine a dissemination point device based on the context to which to disseminate the query, the dissemination point device selected from a plurality of registered dissemination point devices, the plurality of registered dissemination point devices comprising characteristic attributes comprising at least geographical location and types of users that pass the geographical location, and the dissemination point device is selected based on comparing the corresponding characteristic attributes with the context of the query, the one or more processors further operable to transmit the query to the dissemination point device and cause the dissemination point device to trigger a point-to-point communication among mobile devices in search of data that is responsive to the query, the one or more processors further operable to receive from one or more of the mobile devices that are determined to be within a geographical range, that store the data that is responsive to the query in the one or more of the mobile devices, and in which respective one or more of users of the one or more mobile devices have authorized retrieving and providing of the data, the data received without identifying the one or more of the mobile devices, the one or more processors further operable to present the data to a requester.

12. The system of claim 11, wherein the one or more processors are further operable to determine an expiration criterion associated with the query, wherein the query is transmitted to the dissemination point device with the expiration criterion.

13. The system of claim 12, wherein the expiration criterion comprises an expiration time for the query.

14. The system of claim 12, wherein the point-to-point communication is caused to occur until the expiration criterion is met.

15. The system of claim 1, wherein the one or more processors are further operable to determine a reason for the query, wherein the query is transmitted to the dissemination point device with the reason.

16. A non-transitory computer readable storage medium storing a program of instructions executable by a machine to perform a method of privacy-preserved retrieval of contextualized mobile device data, comprising:

receiving a query at a mobile device, context of the query comprising at least a geographical range and expiration time determined by parsing the query, the query received from a dissemination point device selected from a plurality of registered dissemination point devices, the plurality of registered dissemination point devices comprising characteristic attributes comprising at least geographical location and types of users that pass the geographical location, and the dissemination point device is selected based on comparing the corresponding characteristic attributes with the context of the query;

determining at the mobile device whether the mobile device is within the geographical range;

responsive to determining that the mobile device is within the geographical range, determining whether the mobile devices stores the data that is responsive to the query;

responsive to determining that the mobile device stores the data, notifying a user of the mobile device and requesting authorization to retrieve and transmit the data;

responsive to receiving the authorization, retrieving the data from a memory of the mobile device and transmitting the data via a communication network to a remote requester that transmitted the query to the dissemination point device;

responsive to not receiving the authorization, transmitting the query to one or more other mobile devices;

responsive to determining that the mobile device is not within the geographical range, stop transmitting the query to said one or more other mobile devices; and responsive to determining that the mobile device does not store the data, transmitting the query to said one or more other mobile devices.

17. The non-transitory computer readable storage medium of claim 16, wherein the query further comprises an expiration criterion, wherein the mobile device performs the steps of determining whether the mobile devices stores the data that is responsive to the query, notifying a user of the mobile device and requesting authorization to retrieve and transmit the data, retrieving the data from a memory of the mobile device and transmitting the data via a communication network to a remote requester, transmitting the query to one or more other mobile devices, until the expiration criterion is met or the mobile device is out of geographical range or combinations thereof.

18. The non-transitory computer readable storage of claim 17, wherein the expiration criterion comprises an expiration time for the query.

19. The non-transitory computer readable storage of claim 16, wherein the query further comprises a reason for the query, wherein the reason is provided to the mobile device's user with a request for the authorization.

20. The method of claim 1, wherein the query comprises a criteria specifying that the data responding to the query comprise data captured at a specific location and time.

* * * * *